United States Patent
Yanagisawa

(10) Patent No.: US 12,298,617 B2
(45) Date of Patent: May 13, 2025

(54) LIQUID CRYSTAL DISPLAY DEVICE

(71) Applicant: Japan Display Inc., Tokyo (JP)

(72) Inventor: Syou Yanagisawa, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/523,145

(22) Filed: Nov. 29, 2023

(65) Prior Publication Data

US 2024/0094578 A1  Mar. 21, 2024

Related U.S. Application Data

(63) Continuation of application No. 17/238,931, filed on Apr. 23, 2021, now Pat. No. 11,867,997, which is a (Continued)

(30) Foreign Application Priority Data

Jul. 30, 2012 (JP) .................. 2012-168120

(51) Int. Cl.
*G02F 1/1335* (2006.01)
*G02F 1/1339* (2006.01)
(Continued)

(52) U.S. Cl.
CPC ...... *G02F 1/133512* (2013.01); *G02F 1/1339* (2013.01); *G02F 1/134336* (2013.01);
(Continued)

(58) Field of Classification Search
CPC ............. G02F 1/133512; G02F 1/1339; G02F 1/134336; G02F 1/13439; G02F 1/136286;
(Continued)

(56) References Cited

U.S. PATENT DOCUMENTS 5,790,220 A  8/1998  Sakamoto et al.
7,126,660 B2  10/2006  Woo
(Continued)

FOREIGN PATENT DOCUMENTS

CN  1410820 A  4/2003
JP  2001147314 A  5/2001
(Continued)

OTHER PUBLICATIONS

Office Action issued in Taiwanese Patent Application No. 102126162; mailed Mar. 26, 2015; 10 pages, including English translation.
(Continued)

*Primary Examiner* — Tu-Tu V Ho
(74) *Attorney, Agent, or Firm* — UB Greensfelder LLP; Brian E. Turung

(57) ABSTRACT

A black matrix is formed to an edge of a counter substrate. Then, a BM slit, which is an area where the black matrix is not present, is formed in the periphery of a seal material in order to prevent water or moisture from penetrating from the interface between the counter substrate and the black matrix. Then, a light shielding metal is formed in a layer other than a lead line layer, on the side of a TFT substrate, in order to prevent light from leaking from the BM slit. With this structure, it is possible to prevent the light from leaking from the BM slit around a screen. As a result, the degradation of the contrast can be prevented in the periphery of the screen.

10 Claims, 19 Drawing Sheets

Related U.S. Application Data continuation of application No. 16/600,770, filed on Oct. 14, 2019, now Pat. No. 11,009,738, which is a continuation of application No. 15/299,666, filed on Oct. 21, 2016, now Pat. No. 10,488,698, which is a continuation of application No. 13/947,500, filed on Jul. 22, 2013, now Pat. No. 9,507,199.

(51) Int. Cl.
*G02F 1/1343* (2006.01)
*G02F 1/1362* (2006.01)
*G02F 1/1368* (2006.01)
*G02F 1/1333* (2006.01)
*G02F 1/1345* (2006.01)

(52) U.S. Cl.
CPC .... *G02F 1/13439* (2013.01); *G02F 1/136286* (2013.01); *G02F 1/1368* (2013.01); *G02F 1/133345* (2013.01); *G02F 1/134363* (2013.01); *G02F 1/1345* (2013.01); *G02F 1/136204* (2013.01); *G02F 1/136209* (2013.01); *G02F 1/136295* (2021.01); *G02F 2201/121* (2013.01); *G02F 2201/123* (2013.01)

(58) Field of Classification Search
CPC ............. G02F 1/1368; G02F 1/136295; G02F 1/133345; G02F 1/134363; G02F 1/1345; G02F 1/136204; G02F 1/136209; G02F 2201/121; G02F 2201/123
USPC .......................................................... 257/72
See application file for complete search history.

(56) References Cited

U.S. PATENT DOCUMENTS

| | | | |
|---|---|---|---|
| 8,786,807 B2 * | 7/2014 | Zhao | G02F 1/1339 349/110 |
| 9,507,199 B2 | 11/2016 | Yanagisawa | |
| 10,488,698 B2 | 11/2019 | Yanagisawa | |
| 11,009,738 B2 | 5/2021 | Yanagisawa | |
| 2005/0062910 A1 | 3/2005 | Chu et al. | |
| 2006/0028608 A1 | 2/2006 | Youn et al. | |
| 2006/0114367 A1 | 6/2006 | Aramatsu et al. | |
| 2007/0279564 A1 | 12/2007 | Iwato et al. | |
| 2008/0117558 A1 | 5/2008 | Shih et al. | |
| 2009/0033843 A1 | 2/2009 | Gao | |
| 2010/0265449 A1 | 10/2010 | Kira et al. | |
| 2011/0141042 A1 | 6/2011 | Kim et al. | |
| 2011/0242469 A1 | 10/2011 | Kawamura et al. | |
| 2012/0092292 A1 | 4/2012 | Hayakawa | |
| 2012/0229736 A1 | 9/2012 | Osaki et al. | |
| 2013/0154949 A1 | 6/2013 | Roudbari et al. | |

FOREIGN PATENT DOCUMENTS

| | | |
|---|---|---|
| JP | 2003057682 A | 2/2003 |
| JP | 2005283862 A | 10/2005 |
| JP | 2006084713 A | 3/2006 |
| JP | 2006098879 A | 4/2006 |
| JP | 2011215402 A | 10/2011 |
| JP | 2012032506 A | 2/2012 |
| TW | 200515039 A | 5/2005 |
| TW | 201210017 A | 3/2012 |
| TW | 201227056 A | 7/2012 |

OTHER PUBLICATIONS

Office Action issued in Chinese Patent Application No. 201310331893.3; mailed Jul. 29, 2015; 10 pages, including English translation.

Office Action issued in Japanese Patent Application No. 2012-168120; mailed Jan. 19, 2016; 5 pages, including English translation.

Office Action issued in Chinese Patent Application No. 201310331893.3; mailed Sep. 5, 2016; 11 pages, including English translation.

* cited by examiner

LIQUID CRYSTAL DISPLAY DEVICE

CROSS-REFERENCE TO RELATED APPLICATIONS

The present application is a continuation of U.S. patent application Ser. No. 17/238,931, filed Apr. 23, 2021, which is a continuation of U.S. patent application Ser. No. 16/600,770, now U.S. Pat. No. 11,009,738, filed on Oct. 14, 2019, which is a continuation of U.S. patent application Ser. No. 15/299,666, now U.S. Pat. No. 10,488,698, filed on Oct. 21, 2016, which is a continuation of U.S. patent application Ser. No. 13/947,500, now U.S. Pat. No. 9,507,199, filed on Jul. 22, 2013, which claims priority from Japanese Patent Application JP 2012-168120 filed on Jul. 30, 2012. The entire disclosures of each of these applications are hereby incorporated herein by reference.

FIELD OF THE INVENTION

The present invention relates to a display device, and more particularly, to a liquid crystal display device capable of high contrast with low light leakage around a screen.

BACKGROUND OF THE INVENTION

In a liquid crystal display device, pixels having a pixel electrode and a thin film transistor (TFTs) are arranged in a matrix form in a TFT substrate. Further, color filters and the like are formed in a counter substrate at locations corresponding to the pixel electrodes of the TFT substrate.

The counter substrate is disposed opposite to the TFT substrate with a liquid crystal sandwiched between the TFT substrate and the counter substrate. Then, an image is formed by controlling the amount of light transmitted through the liquid crystal molecules for each pixel.

The use of the liquid crystal display device is growing in various fields due to its flatness and light weight. Compact liquid crystal display devices are widely used in electronic devices such as mobile phones and digital still cameras (DSC). The liquid crystal display panel does not emit light by itself, so that it is necessary to have a backlight. If the light from the backlight is not completely blocked in black display, the contrast of the screen is degraded.

Various methods have been developed to increase the contrast, such as the use of a light shielding film and a black matrix. However, in the vicinity of the end face of the liquid crystal display panel, it is difficult to form a light shielding film with high reliability, and there is a problem of light leakage from the backlight in the periphery of the screen. In order to prevent the light leakage from the backlight in the periphery of the screen, Japanese Patent Application Laid-Open No. 2012-32506 describes a structure in which a light-shielding seal material is formed to the edge of the liquid crystal display panel.

Meanwhile, in order to increase the reliability of the liquid crystal display panel, it is important to ensure the reliability of the seal portion for isolating the inside filled with the liquid crystal from the outside. There are lead lines extending from the inside to the outside through the seal portion in order to provide scan signals and image signals to pixels. At this time, the distance between the TFT substrate and the counter substrate is different in the area where the lead lines exist and in the area where the lead lines do not exist. In order to equalize the distance between the TFT substrate and the counter substrate, a dummy metal may be provided in the area where the lead lines do not exist.

Japanese Patent Application Laid-Open No. 2005-283862 describes a structure in which, a slit is formed between metals without forming the dummy metal on the entire surface of the area where the lead lines do not exist. With this structure, it is possible to reduce the influence of the occurrence of static electricity, and to detect defects in the seal material through the slit.

SUMMARY OF THE INVENTION

FIG. 15 is a schematic cross-sectional view of the mechanism of an existing liquid crystal display device in which the light from the backlight leaks around the screen, resulting in low contrast in the periphery of the screen. In FIG. 15, a TFT substrate 100 and a counter substrate 200 are bonded together by a seal material 20, the inside of which is filled with a liquid crystal 300. A black matrix 202 is formed in the counter substrate 200. If the black matrix 202 is formed to the edge of the counter substrate 200, problems such as the removal of the black matrix 202 may occur. For this reason, the black matrix is not formed to the edge of the counter substrate 200. Some of the light from the backlight repeats total reflection in the TFT substrate 100, which is emitted from the vicinity of the TFT substrate 100 and the counter substrate 200 in the direction of the screen.

The liquid crystal display panel is placed in a frame 400 with a flange 401. The light incident to the counter substrate 200 at a certain angle is emitted in the direction of the screen, resulting in low contrast. In order to prevent this, it is preferable that the black matrix 202 is formed to the edge of the counter substrate 200. However, the liquid crystal panel is formed in such a way that a large number of liquid crystal display panels formed in a mother substrate are separated from each other by scribing or other suitable method. Thus, a mechanical stress is applied to the edge of the liquid crystal display panel, so that if the black matrix 202 is formed to the edge of the counter substrate 200, there is a problem that the black matrix is likely to be removed from the edge of the counter substrate 200.

If the black matrix 202 is removed at the edge of the counter substrate 200, water enters from the edge where the black matrix 202 is removed, penetrating into the seal portion of the liquid crystal display panel along the interface between the black matrix 202 and the counter substrate 200. As a result, the reliability of the liquid crystal display device is degraded. FIG. 16 shows the state in which the water and the like, entering from the outside penetrates into the seal portion along the interface between the black matrix 202 and the counter substrate 200, which is shown by the arrows.

In FIG. 16, a gate insulating film 102, a passivation film 106, and an inter-layer insulating film 108 are formed on the TFT substrate 100. Then, the black matrix 202 and an overcoat film 203 are formed on the side of the counter substrate 200. The TFT substrate 100 and the counter substrate 200 are bounded to each other by the seal material 20. The inside of the seal material 20 is filled with the liquid crystal layer 300. The arrows in FIG. 16 schematically show the penetration of the water from the outside into the liquid crystal layer 300 within the seal material 20.

FIG. 17 is a cross-sectional view of the liquid crystal display panel, showing a structure for preventing such a problem. In FIG. 17, the black matrix 202 formed in the counter substrate 200 is formed to the edge of the counter substrate 200. However, the black matrix 202 is separated into outside and inside portions on the outside of the seal material 20 by the BM slit 2021. With this structure, the water, and the like, entering from between the black matrix 202 and the counter substrate 200 at the edge of the counter substrate 200 is blocked by the BM slit 2021, and will not enter the inside of the BM slit 2021. Thus, the structure shown in FIG. 17 can increase the reliability of the liquid crystal display panel.

FIG. 18 is a plan view of the liquid crystal display device having the structure described above. In FIG. 18, a display area 10 is formed in the area where the TFT substrate 100 and the counter substrate 200 overlap. The TFT substrate 100 is larger than the counter substrate 200. A terminal portion 30 is formed in the TFT substrate in the area where the counter substrate 200 is not present. Then, an IC driver 40 is mounted in the terminal portion 30 to drive the liquid crystal display device. Note that a flexible wiring substrate, not shown, is connected to the edge of the terminal portion 30 in order to supply power source, scan signals, image signals, and the like.

In FIG. 18, the display area 10 is formed in the area surrounded by the seal material 20. The black matrix 202 is formed inside the counter substrate 200, extending to the outside of the seal material 20 and to the edge of the counter substrate 200. On the outside of the seal material 20, the BM slit 2021 is formed in a frame shape around the black matrix 202, in order to prevent the water, and the like, from entering from the edge of the black matrix 202.

In this structure, the light may not be blocked in the portion of the BM slit 2021. Thus, the light from the backlight leaks into the screen through the BM slit 2021. In order to prevent the light leakage from the BM slit 2021, a metal light shielding film is formed on the side of the TFT substrate at the position corresponding to the BM slit 2021. The metal may be formed at the time of the formation of the gate electrode layer, or at the time of the formation of the drain electrode layer.

As described above, the BM slit 2021 is shielded from the light on the side of the TFT substrate 100. FIG. 19 is a cross-sectional view of this state. In the example of FIG. 19, a light shielding metal 14 is a metal formed at the time of the formation of the drain layer. The light from the backlight is blocked by the light shielding metal 14, so that the light does not leak from the BM slit 2021 to the outside. The other configurations shown in FIG. 19 are the same as those described in FIG. 16 or FIG. 17. As shown in FIGS. 18 and 19, the width of the light shielding metal 14 is greater than the width of the BM slit 2021.

As shown in FIG. 18, it is possible to shield the liquid crystal display panel from the light from the backlight by the light shielding metal 14 in the three sides where lead lines 11 are not formed. However, it is difficult to form the light shielding metal 14 in the side where the lead lines 11 are present in the same way as in the other three sides of the liquid crystal display panel. In other words, the light shielding metal 14 is formed at the time of the formation of the gate layer or the drain layer, so that the lead lines 11 may be short-circuited by the light shielding metal 14 in the area where the lead lines 11 are present. Here, the lead lines 11 are the lines for connecting scan lines, image signal lines (drain lines), common lines, and the like in the display area 10, to the IC driver 40 provided in the terminal portion 30.

FIGS. 20A, 20B, and 20C are enlarged views of the F portion of FIG. 18 where the lead lines 11 are present. FIG. 20A is an enlarge plan view of the portion of the lead lines in the TFT substrate 100. FIG. 20B is an enlarged plan view of the state of the black matrix 202 and the BM slit 2021 in the counter substrate 200. FIG. 20C is a plan view in the vicinity of the BM slit 2021 when the TFT substrate 100 and the counter substrate 200 overlap. In FIG. 20C, although the MB slit 2021 is shielded from the light in the area where the lead lines 11 are present, the light from the backlight passes through the portion T where the lead lines 11 are not present. As a result, the contrast is reduced in the periphery of the screen.

The purpose of the present invention is to block the light coming from the backlight also in the area where the lead lines 11 are present in FIG. 18, and to prevent degradation of the contrast in the periphery of the screen.

The present invention is to overcome the above problem, and specific aspects are as follows.

(1) In a liquid crystal display device, pixels having a TFT and a pixel electrode are arranged in a matrix form in a TFT substrate. Further, color filters and the like are formed in a counter substrate at locations corresponding to the pixel electrodes of the TFT substrate. The TFT substrate and the counter substrate are bonded together by a seal material. Then, a liquid crystal is sandwiched between the TFT substrate and the counter substrate. The black matrix is formed to an edge of the counter substrate. A BM slit, which is an area where the black matrix is not present, is formed in the entire periphery of the black matrix on the outside of the seal material with a predetermined width wb. A light shielding metal is formed in the entire periphery of the TFT substrate in the area facing the BM slit, with a predetermined width wm. The width wm is greater than the width wb.

(2) In a liquid crystal display device, pixels having a TFT and a pixel electrode are arranged in a matrix form in a TFT substrate. Further, color filters and the like are formed in a counter substrate at locations corresponding to the pixel electrodes of the TFT substrate. The TFT substrate and the counter substrate are bonded together by a seal material. Then, a liquid crystal is sandwiched between the TFT substrate and the counter substrate. A display area is formed in the area where the TFT substrate and the counter substrate overlap. The TFT substrate is larger than the counter substrate. A terminal portion is formed in the TFT substrate in the area where the counter substrate is not present. Lead lines are formed in the terminal portion to connect to the lines in the display area. The black matrix is formed to an edge of the counter substrate. A BM slit, which is an area where the black matrix is not present, is formed in the entire periphery of the black matrix on the outside of the seal material with a predetermined width wb. Further, a light shielding metal is formed in the entire periphery of the TFT substrate at the position corresponding to the BM slit and in a layer other than the layer of the lead lines, with a predetermined width wm. The width wm is greater than the width wb.

According to the present invention, the black matrix can be formed to the peripheral portion, so that it is possible to prevent the leakage of the light from the backlight around the screen and increase the contrast in the periphery of the screen. Further, according to the present invention, the BM slit is formed on the outside of the seal material in order to increase the reliability of the sealing. Then, the light shielding metal is formed in the TFT substrate in order to shield the BM slit from the light around the entire periphery. As a result, it is possible to increase the contrast of the entire screen.

DETAILED DESCRIPTION OF THE PREFERRED EMBODIMENTS

There are various types of the liquid crystal display device such as IPS (In Plane Switching) type, TN type, and VA type. The present invention can be applied to all of these types. The present invention uses a metal light shielding film in the TFT substrate. The metal light shielding film is formed at the same time when electrodes and lines are formed by metal in the TFT substrate. Thus, the cross-sectional structure of a liquid crystal display panel is described first for the later description. There are many different types in the liquid crystal display device, and it is difficult to describe all of them. Thus, the cross-sectional structures of the so-called IPS-PRO type and IPS-LITE type will be described as typical examples.

Figure 1:
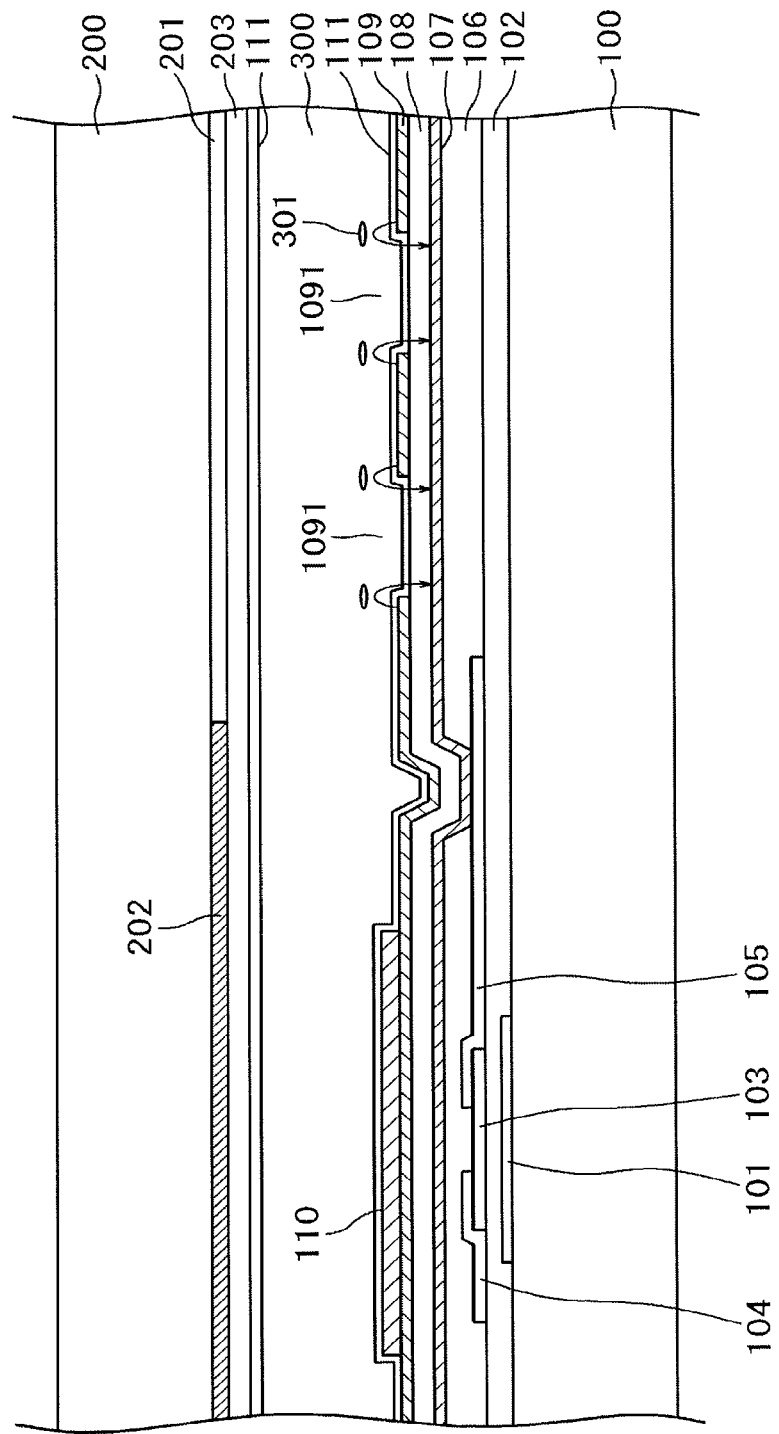
FIG. 1 shows a cross-sectional structure of IPS-PRO of a common top type.

FIG. 1 is a cross-sectional view of a liquid crystal display device of a type that is called IPS-PRO, or the so-called common top type. In FIG. 1, a gate electrode 101 is formed on a TFT substrate 100 of glass, and a gate insulating film 102 is formed on the TFT substrate 100 so as to cover the gate electrode 101. The gate electrode 101 is Al alloy, MoW alloy, or MoCr alloy, or a film formed by laminating these metals. A semiconductor layer 103 is formed above the gate electrode 101 with the gate insulating film 102 between them. A drain electrode 104 and a source electrode 105 are formed on the semiconductor layer 103. The drain electrode 104 and the source electrode 105 face each other with a channel area between them. The drain electrode 104 is connected to an image signal line (drain line) 133 at a position not shown. The drain electrode 104 and the source electrode 105 are Al alloy, MoW alloy, or MoCr alloy, or a film formed by laminating these metals.

An inorganic passivation film 106 of SiN, and the like, is formed on the semiconductor layer 103. The inorganic passivation film 106 covers the electrode 104 and the source electrode 105. Then, a pixel electrode 107 is formed by an ITO on the entire surface of the inorganic passivation film 106. The pixel electrode 107 and the source electrode 105 extending from the TFT are connected to each other through a through hole formed in the inorganic passivation film 107. An inter-layer insulating film 108 is formed on the pixel electrode 107. Then a common electrode 109 with a slit 1091 is formed on the inter-layer insulating film 108.

The common electrode 109 is commonly formed all over the screen. The common electrode 109 is formed by ITO (Indium Tin Oxide), which is a transparent electrode. The ITO has a large electrical resistance. Thus, a common metal 110 with a low resistance is formed on the common electrode 109 in the area where the light does not penetrate, in order to equalize the potential of the whole common electrode 109. In the present invention, the common metal 110 may also be used as the light shielding metal. The common metal 110 is Al alloy, MoW alloy, or MoCr alloy, or a film formed by laminating these metals. An orientation film 111 is formed so as to cover the common electrode 109 and the common metal 110.

In FIG. 1, the counter substrate 200 is disposed opposite the TFT substrate with the liquid crystal layer 300 between them. The black matrix 202 and the color filter 201 are formed on the counter substrate 200, on which the overcoat film 203 is formed so as to cover the black matrix 202 and the color filter 201. Then, the orientation film 111 is formed on the overcoat film 203. In the TFT substrate 100 shown in FIG. 1, when a voltage is applied to the pixel electrode 107, electric field lines are generated between the common electrode 109 and the pixel electrode 110, rotating the liquid crystal molecules 301 to control the transmittance of the liquid crystal 300 for each pixel. Thus, an image is formed.

Figure 2:
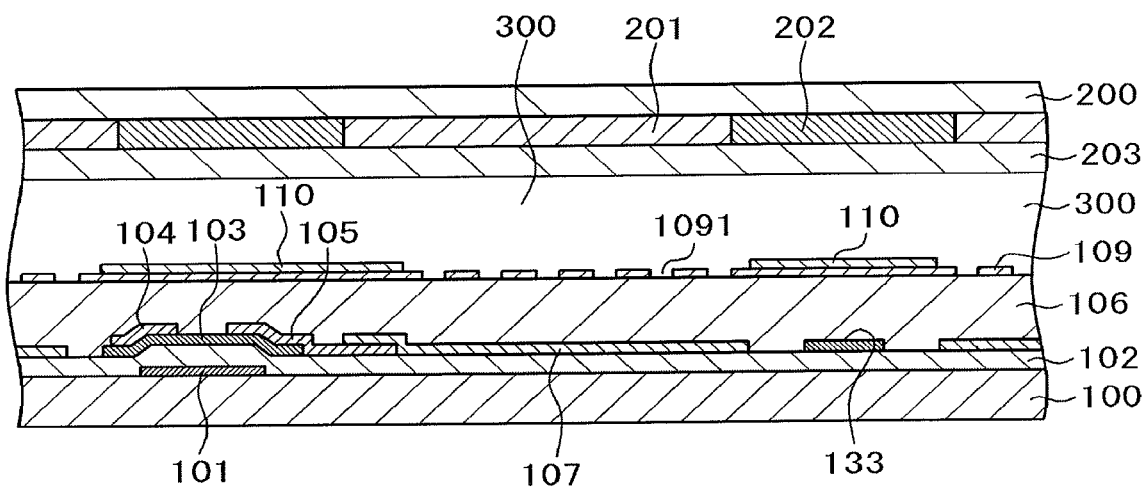
FIG. 2 shows a cross-sectional structure of IPS-LITE.

FIG. 2 is a cross-sectional view of the liquid crystal display device of IPS type, which is the so-called IPS-LITE. The IPS-LITE is the common top type in which the common electrode 109 is formed on the top layer. In FIG. 2, the gate electrode 101, the gate insulating film 102, the semiconductor layer 103, the drain electrode 104, and the source electrode 105 are formed on the TFT substrate 100, by the same process as in the IPS-PRO type described above. In FIG. 2, after the drain electrode 104 and the source electrodes 105 are formed, the pixel electrode 107 is formed by ITO without the insulating film therethrough.

The inorganic passivation film 106 is formed by SiN, and the like, on the pixel electrode 107. Then, the common electrode 109 is formed on the inorganic passivation film 106. The common electrode has the slit 1091 at the position corresponding to the pixel. The common electrode 109 is commonly formed on the entire screen. The common metal 110 is formed on the common electrode 109 in the area where the light does not penetrate, in order to equalize the potential of the common electrode 109. In the present invention, the common metal 110 may also be used as the light shielding metal.

In FIG. 2, the counter substrate 200 is disposed opposite the TFT substrate with the liquid crystal layer 300 between them. The structure of the counter substrate 200 is the same as the case of the IPS-PRO described in FIG. 1, so that the description thereof will be omitted. The present invention will be described in detail with reference to the preferred embodiments.

First Embodiment

Figure 3:
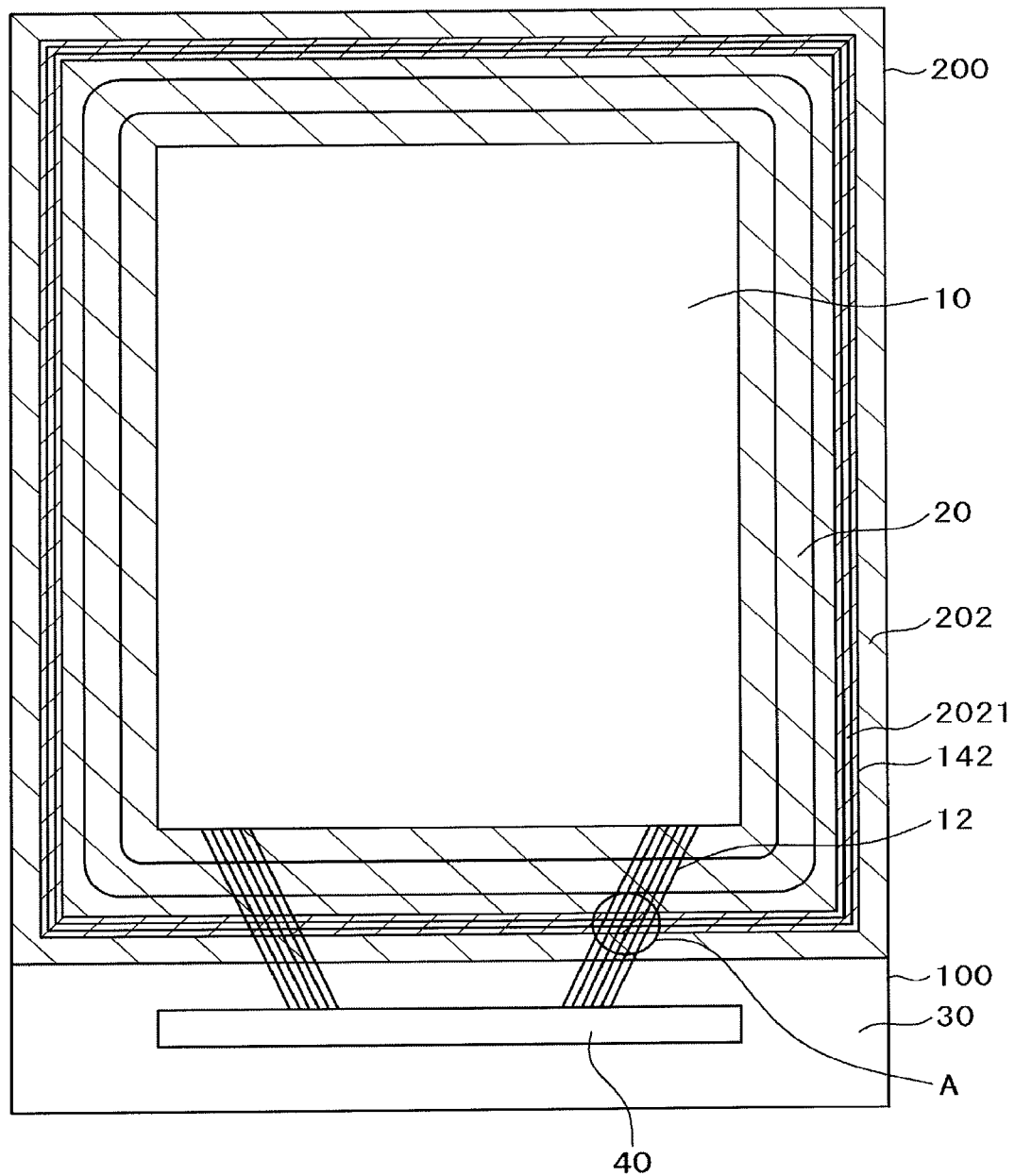
FIG. 3 is a plan view of a first embodiment.

FIG. 3 is a plan view of a liquid crystal display device, showing the structure of a first embodiment. The structure of FIG. 3 is the same as the structure of FIG. 18, except the part where lead lines 12 exist. In other words, in FIG. 3, the black matrix 202 is formed to the end surface of the counter substrate 200. Then, a BM slit 2021 is formed in the entire periphery of the black matrix 202 on the outside of the seal material in order to prevent the water and the like from penetrating the liquid crystal display panel from the interface between the black matrix 202 and the counter substrate 200.

Figure 4A:
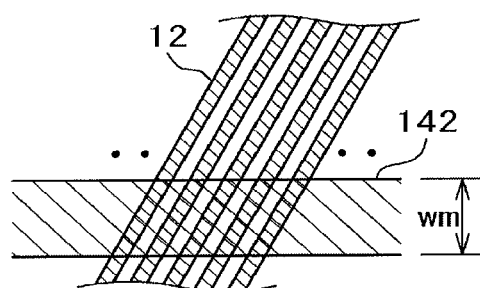
FIGS. 4A, 4B, and 4C are enlarged views of the A portion in the first embodiment.
Figure 4B:
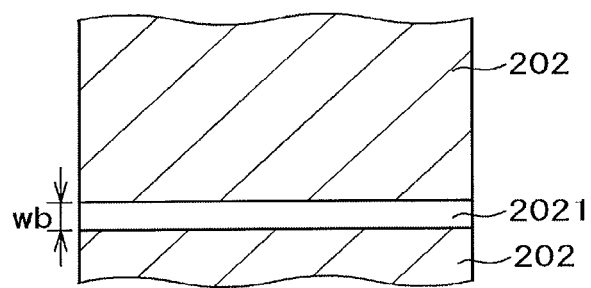
Figure 4C:
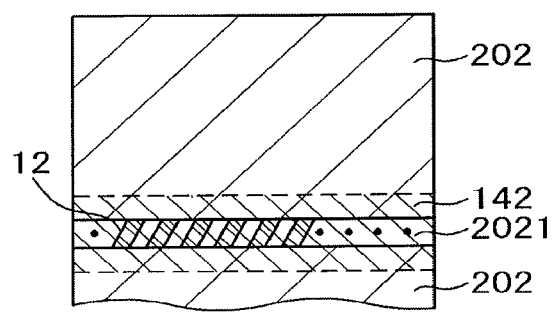
Figure 18:
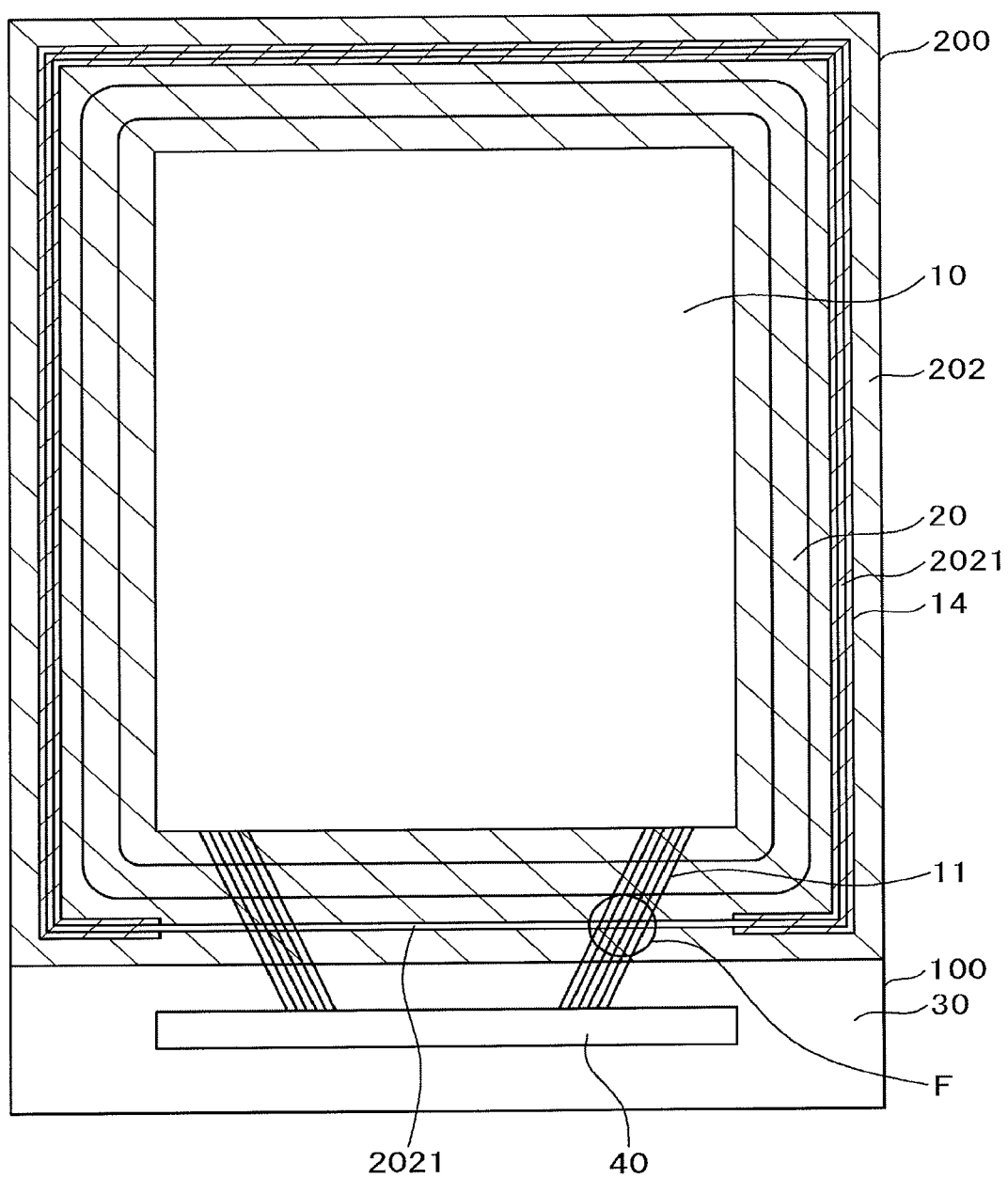
FIG. 18 is a plan view of the conventional example.
Figure 19:
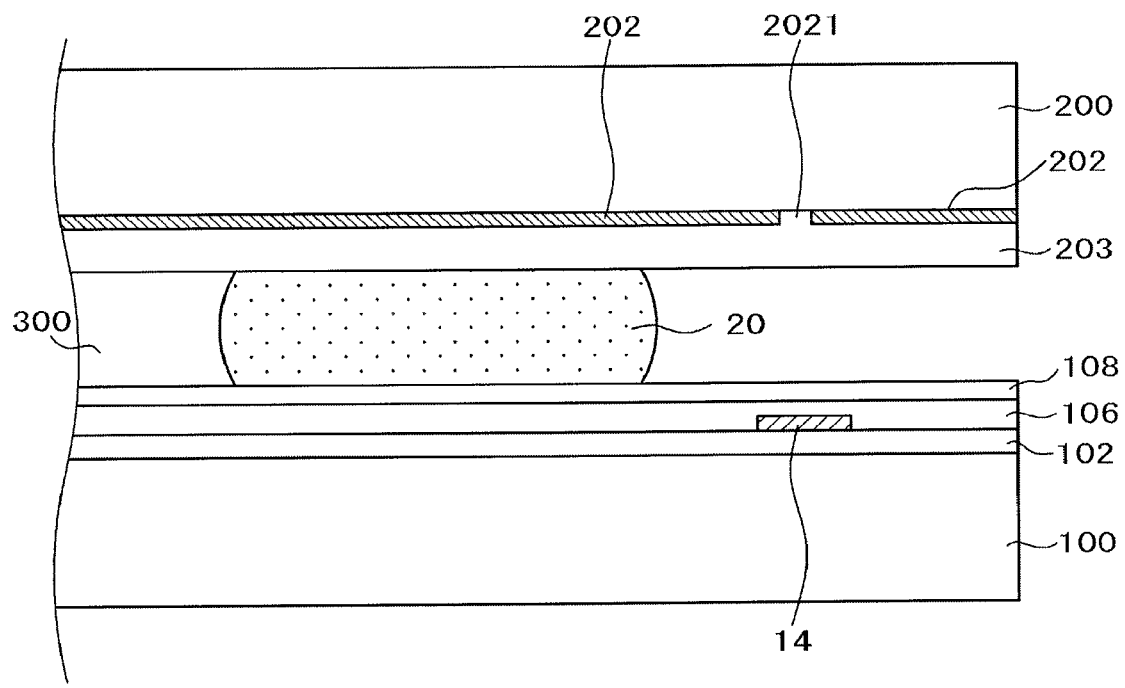
FIG. 19 is a cross-sectional view of the structure for solving part of the problem of the conventional example.
Figure 20A:
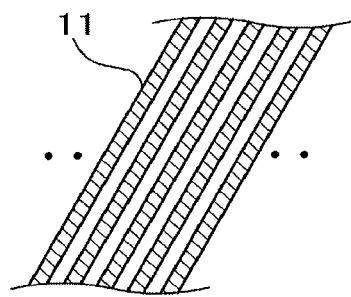
FIGS. 20A, 20B, and 20C are enlarged views of the problem of the conventional example shown in FIG. 18.
Figure 20B:
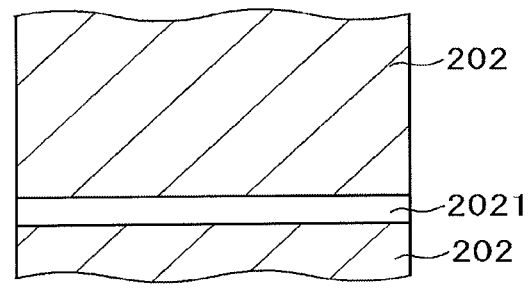
Figure 20C:
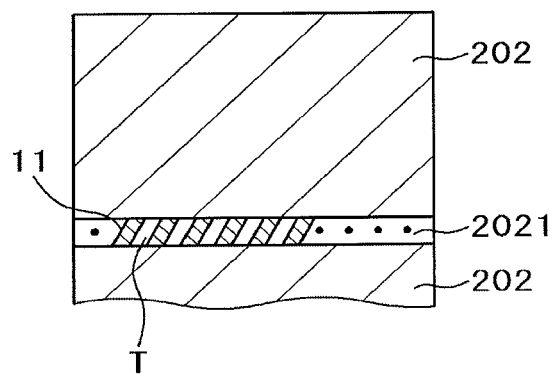

FIG. 3 is different from FIG. 18 in that the light shielding metal 142 is also formed on the side where the lead lines 12 are formed, on the side of the TFT substrate. FIGS. 4A, 4B, and 4C are enlarged views of the A portion of FIG. 3. FIG. 4A is a plan view of the lead lines 12 and the light shielding metal 142 on the side of the TFT substrate 100. FIG. 4B shows the black matrix 202 and the BM slit 2021 on the inside of the counter substrate 200. FIG. 4C is a plane view showing the state in which the TFT substrate 100 and the counter substrate 200 overlap.

In FIG. 4A, the lead lines 12 are the gate lead lines 12 formed in the same layer as the gate electrode. The drain light shielding metal 142 is formed so as to cover the gate lead lines 12 on the same layer as the drain electrode at the position corresponding to the BM slit 2021 shown in FIG. 4B. In FIG. 4A, the gate lead lines 12 and the drain light shielding metal 142 are formed in the different layers with the gate insulating film between them. Thus, a short circuit does not occur between the gate lead lines 12 and the drain light shielding film 142.

FIG. 4C is a plane view showing the state in which the TFT substrate 100 and the counter substrate 200 overlap in the vicinity of the BM slit 2021. As shown in FIG. 4C, the BM slit 2021 is covered by the drain light shielding metal 142 from the bottom on the side of the TFT substrate 100. Thus, the light from the backlight does not pass through the BM slit 2021. The width wm of the drain light shielding metal 142 is greater than the width wb of the BM slit 2021. For example, the width wb of the BM slit 2021 is 30 to 50 μm, and the width wm of the drain light shielding metal 142 is 50 to 80 μm. The example of the widths is the same as in the other embodiments.

As described above, in the present embodiment, the lead lines 12 are formed in the same layer as the gate electrode, and the light shielding metal 142 is formed in the same layer as the drain electrode. Thus, the BM slit 2021 formed in the counter substrate 200 can be completely shielded from the light, also in the area where the lead lines 12 are formed. As a result, it is possible to achieve better contrast all around the screen.

Second Embodiment

Figure 5:
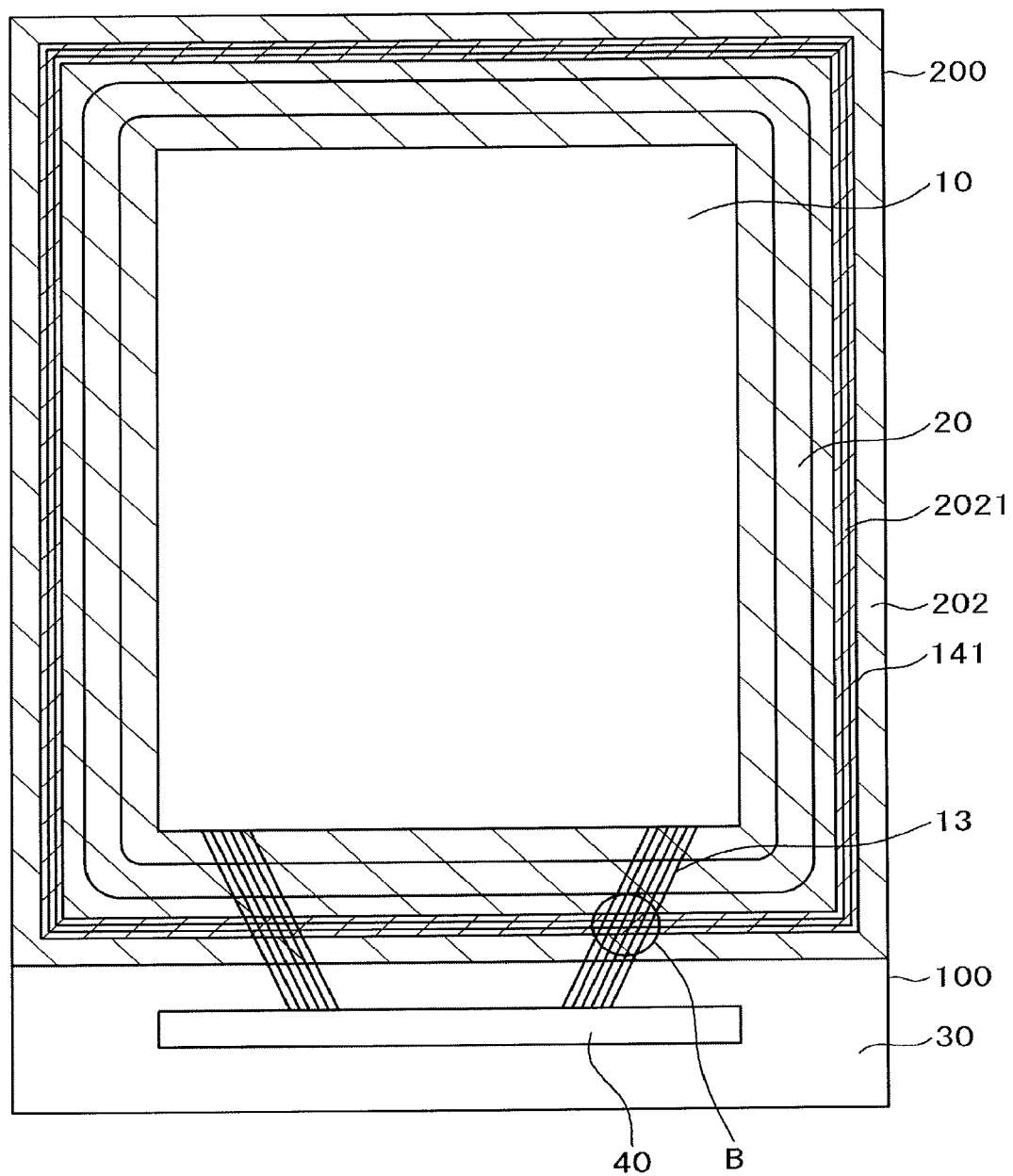
FIG. 5 is a plan view of a second embodiment.

FIG. 5 is a plan view of a liquid crystal display device, showing the structure of a second embodiment. The structure of FIG. 5 is the same as the structure of FIG. 3, except the area where lead lines 13 are present. In other words, in FIG. 5, the black matrix 202 is formed to the edge of the counter surface 200, and the BM slit 2021 is formed in the entire periphery of the black matrix on the outside of the seal material 20, in order to prevent water or moisture from penetrating the liquid crystal display panel from the interface between the black matrix 202 and the counter substrate 200.

Figure 6A:
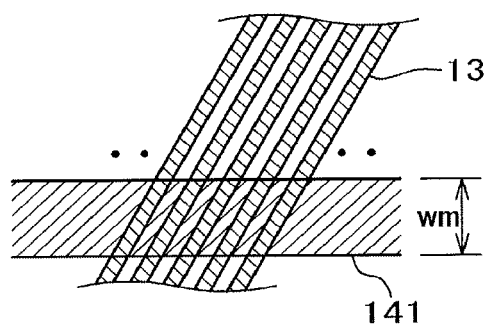
FIGS. 6A, 6B, and 6C are enlarged views of the B portion in the second embodiment.
Figure 6B:
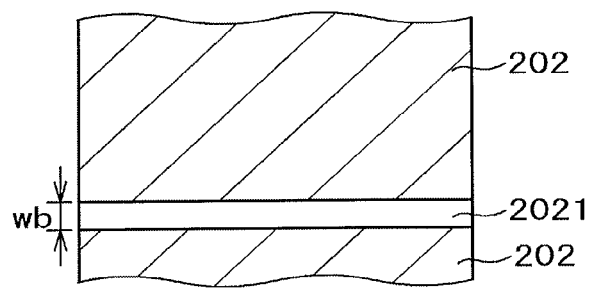
Figure 6C:
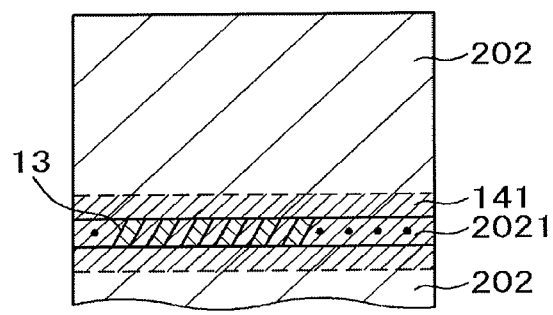

Also in FIG. 5, in a similar way to FIG. 3, the light shielding metal 141 is formed on the side where the lead lines 13 are formed, on the side of the TFT substrate 100. FIG. 5 is different from FIG. 3, which is the first embodiment, in that the relationship between the lead lines 13 and the light shielding metal 141 is reversed. FIGS. 6A, 6B, and 6C are enlarged views of the B portion of FIG. 5. FIG. 6A is a plan view of the lead lines 13 and the light shielding metal 141 on the side of the TFT substrate 100. FIG. 6B shows the black matrix 202 and the BM slit 2021 on the inside of the counter substrate 200. FIG. 6C is a plan view showing the state in which the TFT substrate 100 and the counter substrate 200 overlap.

In FIG. 6A, the lead lines 13 are the drain lead lines 13 formed in the same layer as the drain electrode. The gate light shielding metal 141 is formed in the same layer as the gate electrode at the position corresponding to the BM slit 2021 shown in FIG. 6B. The gate light shielding metal 141 covers below the drain lead lines 13. In FIG. 6A, the drain lead lines 13 and the gate light shielding metal 141 are formed in the different layers with the gate insulating film between them. Thus, a short circuit does not occur between the drain lead lines 13 and the gate light shielding metal 141.

FIG. 6C is a plan view showing the state in which the TFT substrate 100 and the counter substrate 200 overlap in the vicinity of the BM slit 2021. As shown in FIG. 6C, the BM slit 2021 is covered by the gate light shielding metal 141 from the bottom on the side of the TFT substrate 100. Thus, the light from the backlight does not pass through the BM slit 2021. The width wm of the gate light shielding film 141 is greater than the wide wb of the BM slit 2021. For example, the width wb of the BM slit 2021 is 30 to 50 μm and the width wm of the gate light shielding metal 141 is 50 to 80 μm.

As described above, in the present embodiment, the lead lines 13 are formed in the same layer as the drain electrode, and the light shielding metal 141 is formed in the same layer as the gate electrode layer. Thus, the BM slit 2021 formed in the counter substrate 200 can be completely shielded from the light, also in the area where the lead lines 13 are formed. As a result, it is possible to achieve better contrast all around the screen.

Third Embodiment

Figure 7:
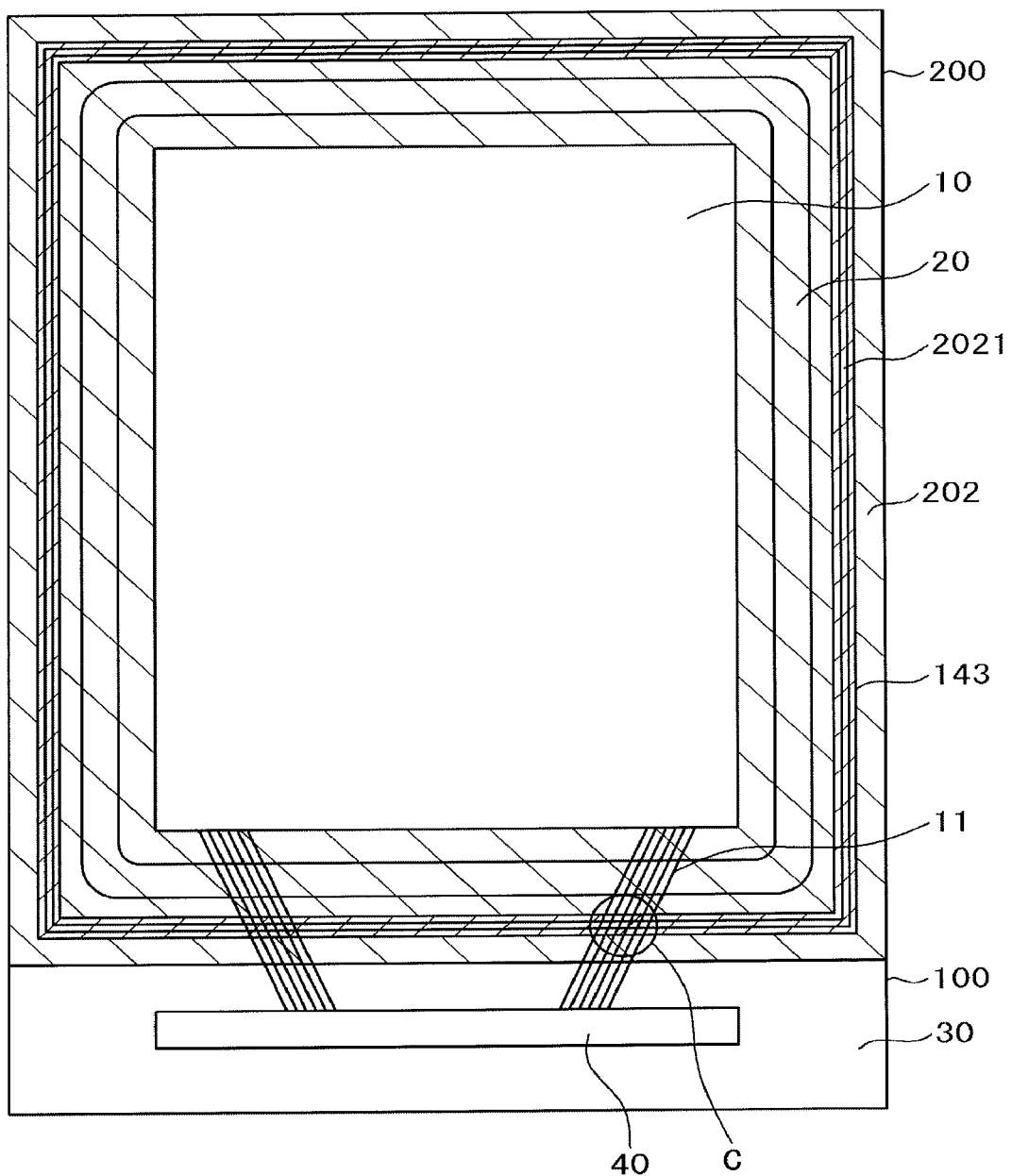
FIG. 7 is a plan view of a third embodiment.

FIG. 7 is a plan view of a liquid crystal display device, showing the structure of a third embodiment. The structure of FIG. 7 is the same as the structure of FIG. 3, except the area where lead lines 11 are present. In other words, in FIG. 7, the black matrix 202 is formed to the edge of the counter substrate 200, and the BM slit 2021 is formed in the entire periphery of the black matrix on the outside of the seal material 20, in order to prevent water or moisture from penetrating the liquid crystal display panel from the interface between the black matrix 202 and the counter substrate 200.

Figure 8A:
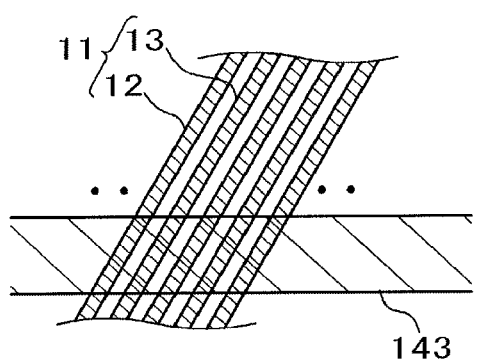
FIGS. 8A, 8B, and 8C are enlarged views of the C portion in the third embodiment.
Figure 8B:
Figure 8C:
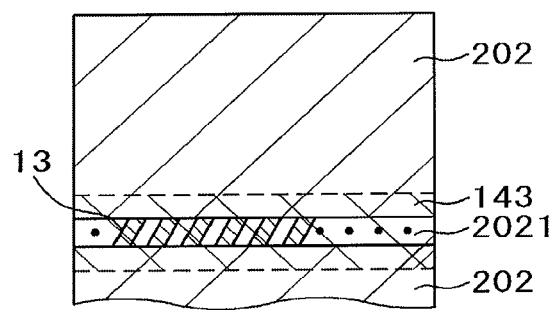

Also in FIG. 7, in a similar way to FIG. 3, a light shielding metal 143 is formed on the side where the lead lines 11 are formed, on the TFT substrate. FIG. 7 is different from FIG. 3 of the first embodiment or from FIG. 5, which is the second embodiment, in that the light shielding metal 143 is formed by the common light shielding metal 143. FIGS. 8A, 8B, and 8C are enlarged views of the C portion of FIG. 7. FIG. 8A is a plan view of the lead line 11 and the light shielding metal 143 on the side of the TFT substrate 100. FIG. 8B shows the black matrix 202 and the BM slit 2021 on the inside of the counter substrate 200. FIG. 8C is a plan view showing the state in which the TFT substrate 100 and the counter substrate 200 overlap.

In FIG. 8A, the lead line 11 includes the drain lead line 13 formed in the same layer as the drain electrode, and the gate lead line 12 formed in the same layer as the gate electrode.

The common light shielding metal 143 is formed in the same layer as the common metal at the position corresponding to the BM slit 2021 shown in FIG. 8B. The common light shielding metal 143 covers the gate lead line 12 and the drain lead line 13. In FIG. 8A, the gate lead line 12 or the drain lead line 13, and the common light shielding metal 143 are formed in the different layers with the inorganic passivation film and the like between them. Thus, a short circuit does not occur between the gate lead line 12 or the drain lead line 13, and the common light shielding metal 143.

FIG. 8C is a plan view showing the state in which the TFT substrate and the counter substrate 200 overlap in the vicinity of the BM slit 2021. As shown in FIG. 8C, the BM slit 2021 is covered by the common light shielding metal 143 from the bottom on the side of the TFT substrate 100. Thus, the light from the backlight does not pass through the BM slit 2021. In the present embodiment, the conditions are the same as those in the first or second embodiment, such as that the width wm of the common light shielding metal 143 is greater than the width wb of the BM slit 2021.

As described above, in the present embodiment, the lead lines 11 can be formed in multiple layers, such as in the same layer as the gate electrode or in the same layer as the drain electrode. Thus, the present embodiment can be applied to the case in which the density of the lead lines 11 is greater than the case in the first or second embodiment. Further, it is possible to completely shield the BM slit 2021 from the light from the backlight by the common light shielding metal 143. As a result, better contrast can be achieved all around the screen.

Fourth Embodiment

Figure 9:
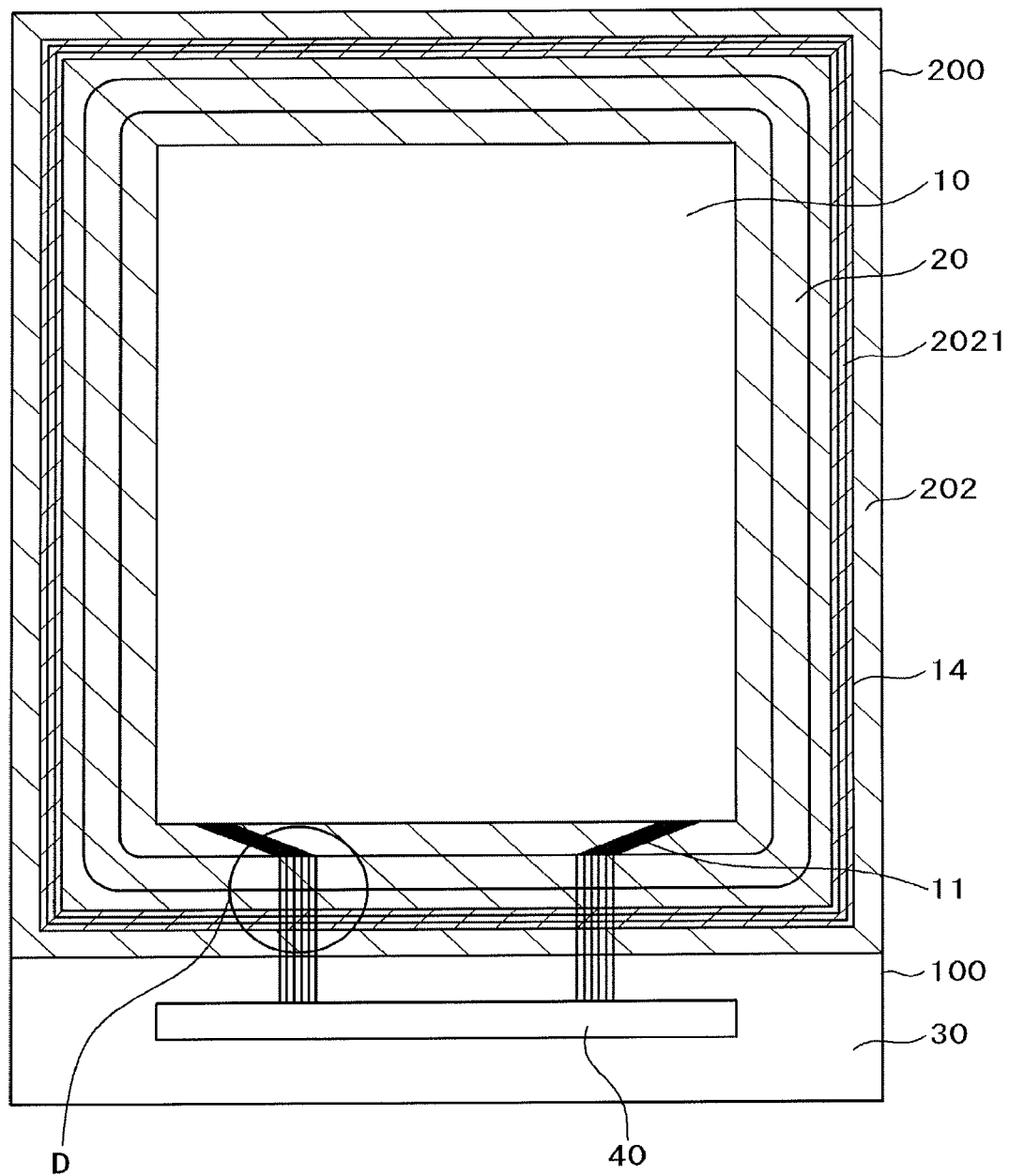
FIG. 9 is a plan view of a fourth embodiment.

FIG. 9 is a plan view of a liquid crystal display device, showing the structure of a fourth embodiment. The structure of FIG. 9 is the same as the structure of FIG. 3, except the area where the lead lines 11 are present. In other words, in FIG. 9, the black matrix 20 is formed to the edge of the counter substrate 200, and the BM slit 2021 is formed in the entire periphery of the black matrix on the outside of the seal material 20, in order to prevent water or moisture from penetrating the liquid crystal display panel from the interface between the black matrix 202 and the counter substrate 200. Also in FIG. 9, in a similar way to the first to third embodiments, the light shielding metal 14 is formed on the side where the lead line 11 is formed, on the side of the TFT substrate 100.

Figure 10A:
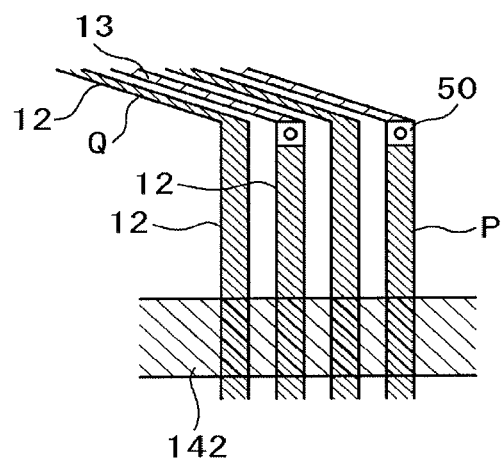
FIGS. 10A, 10B, and 10C are enlarged views of the D portion in the fourth embodiment.
Figure 10B:
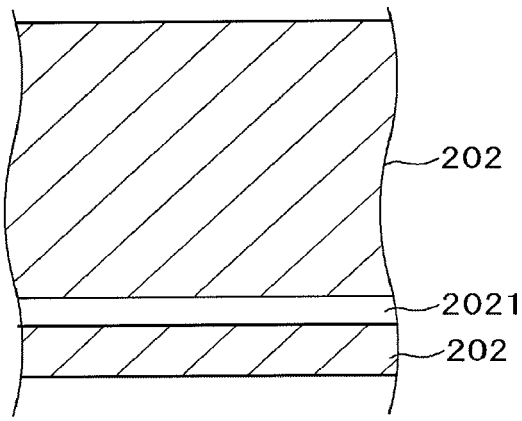
Figure 10C:
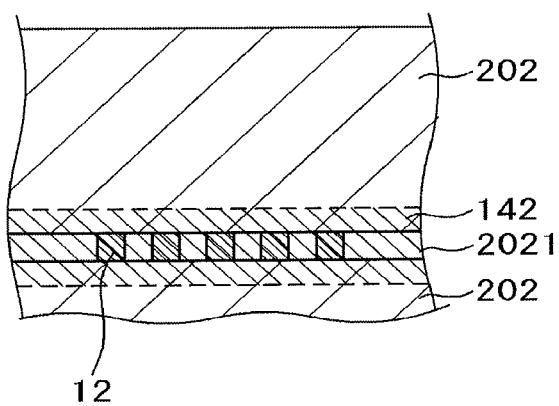

In FIG. 9, which is the present embodiment, the planar shape of the lead lines 11 is different from that of the first to third embodiments. In other words, the lead lines 11 shown in FIG. 9 are not only diagonal lines. They include a portion of diagonal lines as well as a portion that is parallel to the liquid crystal display panel. FIGS. 10A, 10B, and 10C are enlarged views of the D portion of FIG. 9. In FIG. 10A, the line pitch in the diagonal line portion Q is smaller than in the line portion P that is parallel to the side of the liquid crystal display panel. In this portion, it is preferable that the lead lines 11 are provided separately with the gate lead line 12 and drain lead line 13, in order to ensure isolation between the lines. Meanwhile, in the portion P that is parallel to the side of the liquid crystal display panel, it is possible to set the line pitch larger than the line pitch in the diagonal line portion Q.

In FIG. 10A, the drain lead line 13, which is the diagonal line Q, switches to the gate lead line 12 through the through hole 50 in the curved portion from the diagonal portion Q to the portion P that is parallel to the side of the liquid crystal display panel. Thus, in the portion P that is parallel to the side of the liquid crystal display panel, the lead line 11 can be formed only by the gate lead line 12 in the same layer as the gate electrode. In such a case, the drain light shielding metal 142 formed in the same layer as the drain electrode can be used as the light shielding metal.

FIG. 10C is a plan view showing the state in which the TFT substrate 100 and the counter substrate 200 overlap in the vicinity of the BM slit 2021. As shown in FIG. 10C, the BM slit 2021 is covered by the drain light shielding metal 142 from the bottom on the side of the TFT substrate 100. Thus, the light from the backlight does not pass through the BM slit 2021.

As described above, in the present embodiment, the gate lead lines 12 and the drain lead lines 13 are used as the lead lines 11 in the diagonal line portion with a small pitch. Then, only the gate lead lines 12 are used as the lead lines 11 in the large-pitch portion that is parallel to the side of the liquid crystal display panel (hereinafter referred to as the parallel line). Thus, the drain shielding metal can be used as the light shielding metal for the BM slit 2021, so that there is no need to form another new metal as the light shielding metal.

In the above description, it is assumed that the diagonal lines are the two-layer lines and the parallel lines are the gate lead lines 12. However, this structure can be reversed such that the diagonal lines are the two-layer lines and the parallel lines are the drain lines 13. In such a case, the gate light shielding metal 141 is used as the light shielding metal.

Fifth Embodiment

Figure 11:
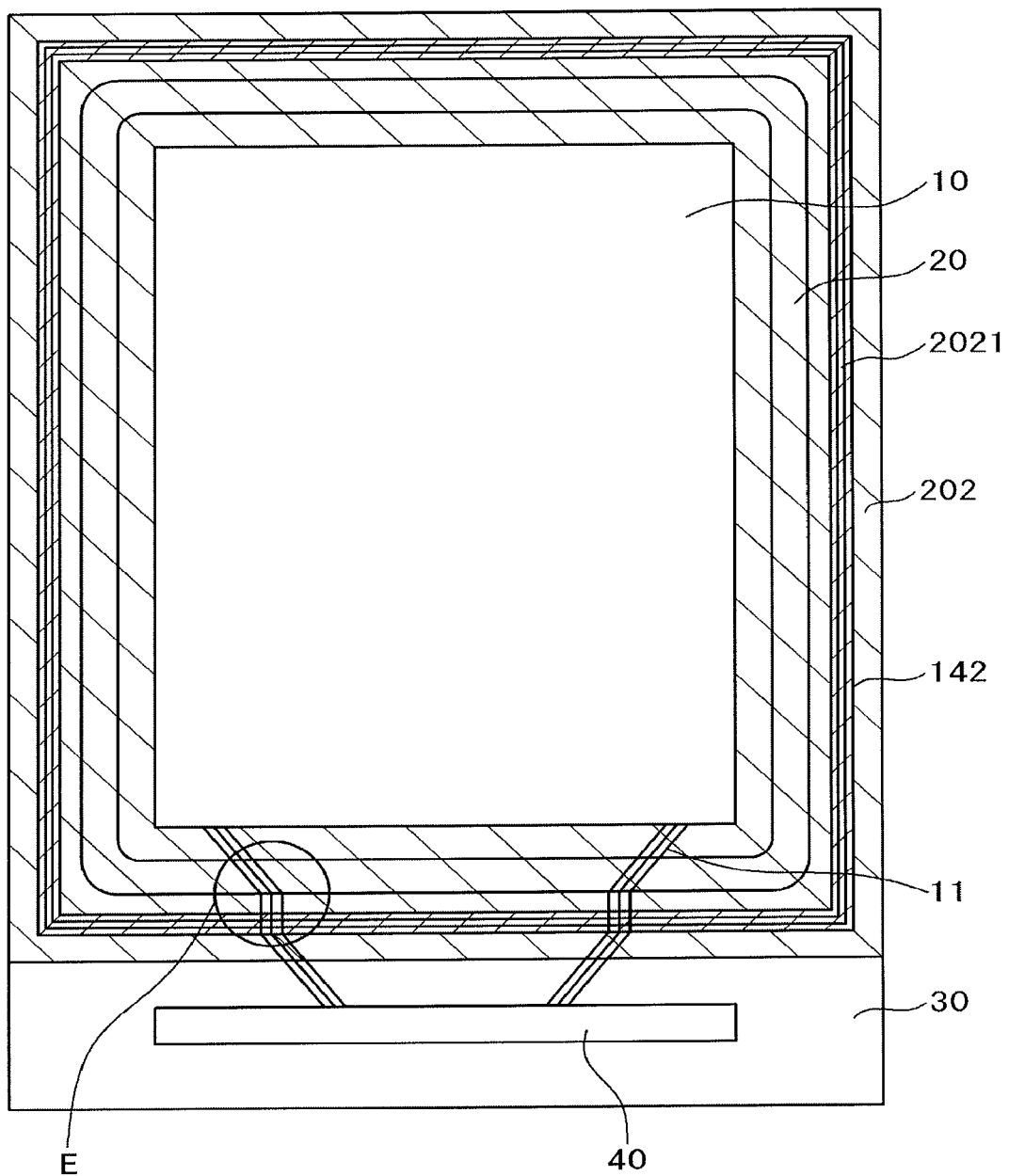
FIG. 11 is a plan view of a fifth embodiment.

FIG. 11 is a plan view of a liquid crystal display device, showing the structure of a fifth embodiment. The structure of FIG. 11 is the same as the structure of FIG. 3, except the area where the lead line 11 are present. In other words, in FIG. 11, the black matrix 202 is formed to the edge of the counter substrate 200, and the BM slit 2021 is formed in the entire periphery of the black matrix on the outside of the seal material 20, in order to prevent water or moisture from penetrating the liquid crystal display panel from the interface between the black matrix 202 and the counter substrate 200. Also in FIG. 11, in a similar way to the first to fourth embodiments, the light shielding metal 142 is formed on the side where the lead lines 11 are formed, on the side of the TFT substrate 100.

Figure 12A:
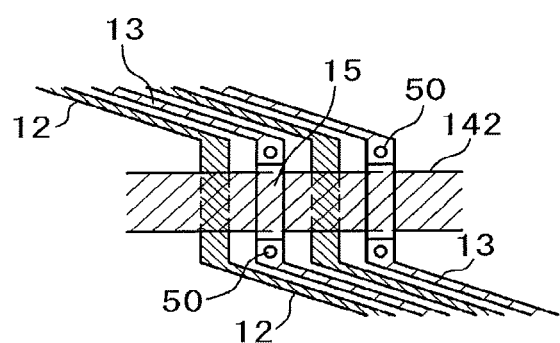
FIGS. 12A, 12B, and 12C are enlarged views of the E portion in the fifth embodiment.
Figure 12B:
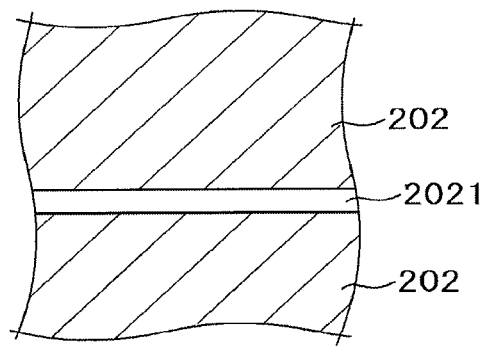
Figure 12C:
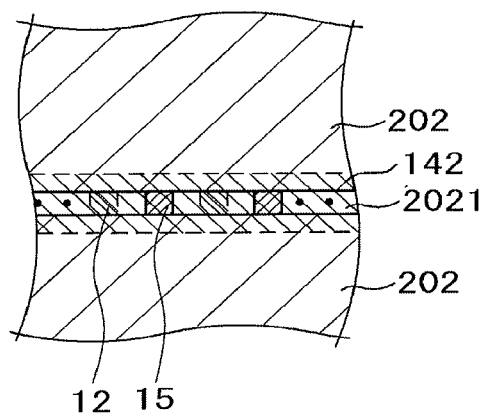

In FIG. 11, which is the present embodiment, the planar shape of the lead lines 11 is different from that of the first to third embodiments. In other words, the lead lines shown in FIG. 11 are the diagonal lines, and switch from the diagonal lines to the parallel lines and back to the diagonal lines again. FIGS. 12A, 12B, and 12C are enlarged views of the E portion of FIG. 11. In FIG. 12A, the lead lines in the diagonal line portion are two-layer lines of the gate lead line 12 and the drain lead line 13. Then, the lead lines in the parallel line portion are two-layer lines of the gate lead line 12 and a bridging ITO 15. In this case, the drain light shielding metal 142 formed in the same layer as the drain electrode is used as the light shielding metal.

In FIG. 12A, the gate lead line is formed below the drain light shielding metal, and the bridging ITO is formed above the drain light shielding metal. The lead lines switch back to the diagonal lines after the position corresponding to the light shielding metal, which are two-layer lines of the gate lead line 12 and the drain lead line 13. At this time, the bridging ITO 15 switches to the drain lead line 13 through the through hole 50.

The drain light shielding metal 142 is formed in the TFT substrate 100 at the position corresponding to the BM slit 2021 formed in the counter substrate 200 shown in FIG. 12B. FIG. 12C is a plan view showing the state in which the TFT substrate 100 and the counter substrate 200 overlap in the vicinity of the BM slit 2021. In FIG. 12C, the BM slit 2021 is completely covered by the drain light shielding metal 142 from the bottom. The gate lead line 12 and the bridging ITO 15 are present in the area of the BM slit 2021.

For example, in IPS-PRO, when the bridging ITO 15 is formed by using the pixel electrode 107, the formation of the through hole in the passivation film 106 and the connection to the drain lead line 13 can be performed at the same time as the process in the pixel portion, in which the through hole is formed in the passivation film 106 and the pixel electrode 107 is connected to the source electrode 105. Thus, it is possible to form the bridging ITO 15 without increasing the number of steps.

In the structure described above, when the diagonal line switches to the parallel line, the drain lead line 13 switches to the bridging ITO 15. However, it is also possible that the gate lead line 12 switches to the bridging ITO 15. In such a case, the gate light shielding metal 141 is used as the light shielding metal.

Note that, as shown in FIG. 11, when the lead lines switch from the diagonal lines to the parallel lines and back to the diagonal lines, it is also possible to use other line structures than the line structure shown in FIGS. 12A, 12B, and 12C. The first structure is as follows: The diagonal lines are two-layer lines of the drain lead line 13 and the gate lead line 12. Then, the drain lead line 13 switches to the gate lead line 12 in the parallel line portion through the through hole 50. Thus, the lead lines in the parallel line portion are only the lead lines 12. In this case, the drain light shielding metal 142 is used as the light shielding metal. When the parallel lines switch to the diagonal lines, the lead lines are back again to the two-layer lines of the drain lead line 13 and the gate line 12 through the through hole 50.

The second structure is as follows: The diagonal lines are two-layer wiring of the drain lead line 13 and the gate lead line 12 similarly as shown in FIG. 12. Then, the gate lead line 12 switches to the drain lead line 13 through the through hole 50 in the parallel line portion. Thus, the lead lines are only the drain lead lines 13 in the parallel line portion. In this case, the gate light shielding metal 141 is used as the light shielding metal. When the parallel line switches to the diagonal line, the lead lines are back again to the two-layer lines of the drain lead line 13 and the gate lead line 12 through the through hole 50.

Sixth Embodiment

As shown in FIG. 11 or 12, when the bridging ITO 15 is used as the lead line 11, the following problem may occur if the ITO of the common electrode 109 in IPS-LITE is used as the ITO. The common electrode 109 in IPS-LITE is formed on the top layer above the passivation film 106. In other words, the insulating film is not present on the ITO. The adhesive strength between the ITO and the seal material 20 is smaller than the adhesive strength between the insulating film and the seal material. For this reason, the reliability of the seal material 20 may be degraded.

Figure 13:
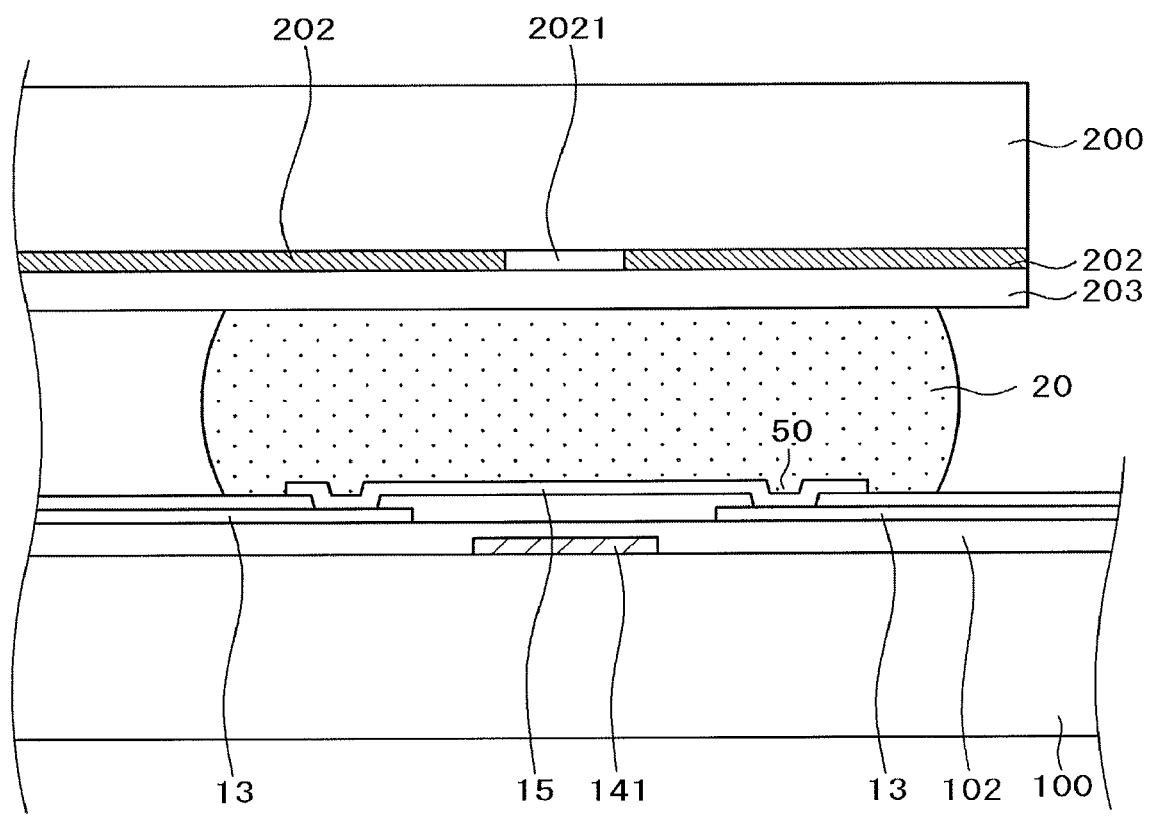
FIG. 13 is a cross-sectional view of the seal portion in a sixth embodiment.

Meanwhile, the light shielding metal 14 should be formed at the position corresponding to the bridging ITO 15. In this case, as shown in FIG. 13, the BM slit 2021 in the counter substrate 200 is formed to overlap the seal material 20, and the bridging ITO 15 is also formed to overlap the seal material 20. In this way, the contact between the bridging ITO 15 and the seal material 20 can be achieved in such a way that the bridging ITO 15 overlaps only a portion of the width of the seal material 20, instead of the entire width of the seal material 20. In this way, it is possible to prevent the reduction in the adhesive reliability of the seal portion.

Figure 14:
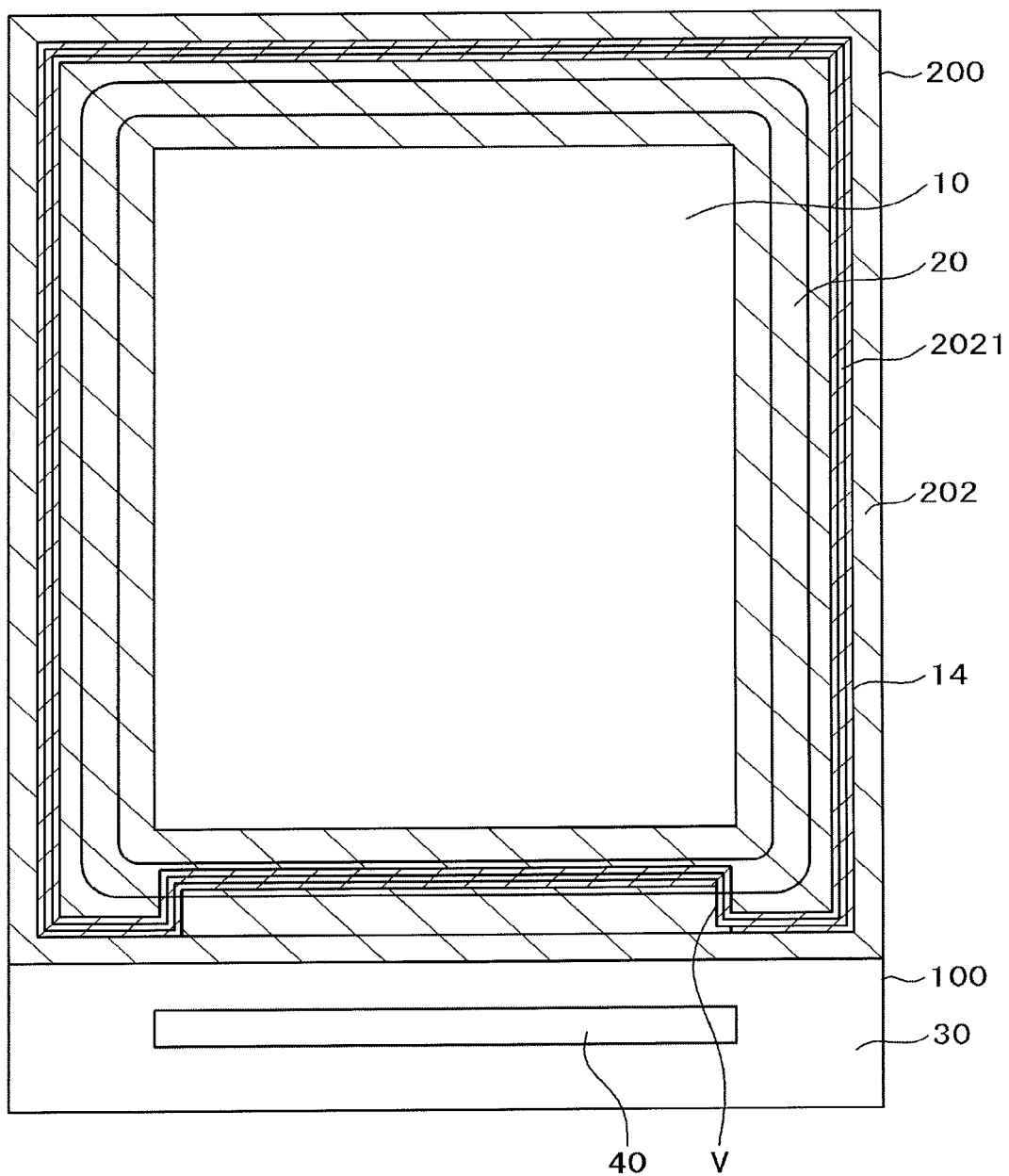
FIG. 14 is a plan view of the sixth embodiment.
Figure 15:
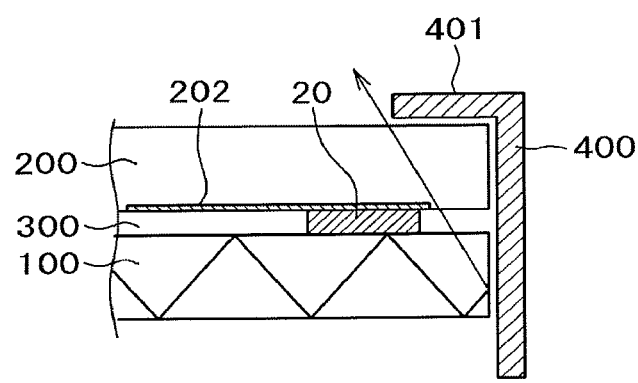
FIG. 15 is a schematic cross-sectional view of the problem in the conventional example.
Figure 16:
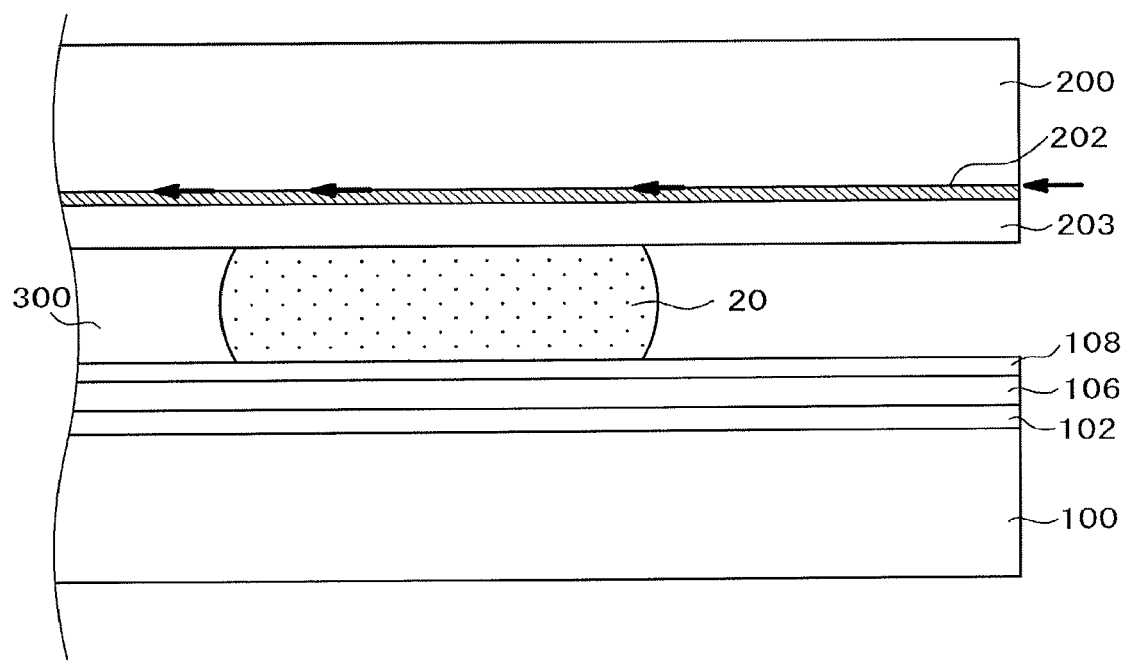
FIG. 16 is a schematic cross-sectional view of the problem in another conventional example.
Figure 17:
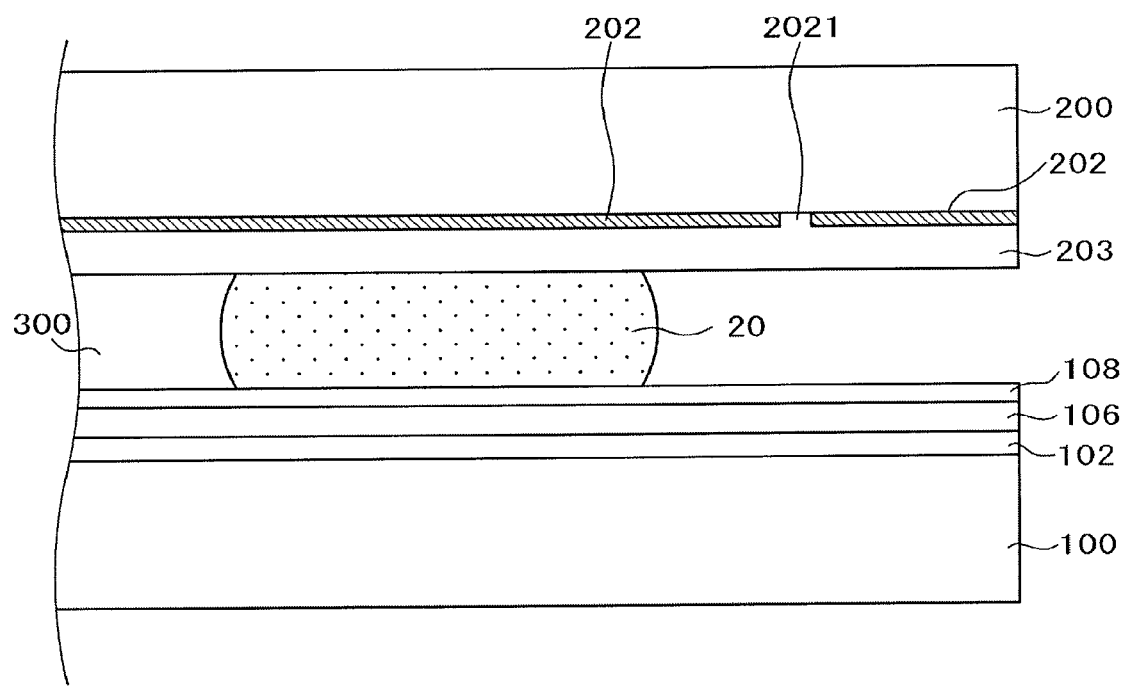
FIG. 17 is a cross-sectional view of the structure for solving the problem shown in FIG. 16.

FIG. 14 is an example in which the BM slit 2021 and the bridging ITO are formed within the width of the seal material 20 as shown in FIG. 13. In FIG. 14, on the side where the lead lines not shown are formed, the step portion V is provided in the BM slit 2021 and the light shielding metal 14 so that the seal material 20, the BM slit 2021, and the bridging ITO can be formed in a portion of the seal material 20 within the width thereof. The same effect can also be obtained by providing the step in the seal material in the reverse direction, instead of providing the step portion in the BM slit 2021 and the light shielding metal 14.

What is claimed is:
1. A display device comprising,
a TFT substrate,
a plurality of pixel formed in a matrix on the TFT substrate,
a first line electrically connected to an outer circuit,
a counter substrate opposed to the TFT substrate,
a black matrix having a slit and formed on the counter substrate, and
a seal material bonding the TFT substrate and the counter substrate,
wherein the slit and the seal material are formed to surround a display area where the plurality of pixel is formed,
wherein the slit has a first slit located between the display area and the outer circuit and extending a first direction,
wherein the first line has a first portion and a second portion,
wherein the seal material has a portion located closer to the display area than the first slit,
wherein the second portion overlaps the portion of the seal material in a plan view,
wherein the second portion extends a second direction intersecting the first direction, and intersects the first slit, and
wherein the first portion is between the display area and the first slit and extends a direction intersecting the first direction and the second direction.
2. The display device according to claim 1,
wherein the first portion and the second portion are formed on different layers.
3. The display device according to claim 2,
wherein the first portion and the second portion are connected by a through hole, and
wherein the through hole is between the slit and the display area.
4. The display device according to claim 1,
wherein the slit does not overlap the seal material, in the plan view.
5. The display device according to claim 1,
wherein the black matrix is formed to an edge of the counter substrate, and
wherein the slit is between the edge of the counter substrate and the display area in a plan view.
6. The display device according to claim 1, further comprising a peripheral area formed around the display area,
wherein the peripheral area includes a terminal area, and
wherein the outer circuit is mounted on the terminal area.

7. The display device according to claim 3, further comprising a second line extending the first direction,
   wherein the second line overlaps the slit, in the plan view, and
   wherein a width of the second line is larger than a width of the slit.
8. The display device according to claim 7,
   wherein the second line is formed on a different layer from a layer where the second portion is formed.
9. The display device according to claim 7,
   wherein the second line is formed on a same layer from a layer where the first portion is formed.
10. The display device according to claim 7,
    wherein the through hole is between the display area and the second line, in the plan view.

\* \* \* \* \*